US007900947B2

(12) United States Patent
Inoue

(10) Patent No.: US 7,900,947 B2
(45) Date of Patent: Mar. 8, 2011

(54) BICYCLE SUSPENSION SYSTEM

(75) Inventor: Jun Inoue, Osaka (JP)

(73) Assignee: Shimano Inc., Osaka (JP)

( * ) Notice: Subject to any disclaimer, the term of this patent is extended or adjusted under 35 U.S.C. 154(b) by 159 days.

(21) Appl. No.: 12/183,304

(22) Filed: Jul. 31, 2008

(65) Prior Publication Data
US 2010/0025957 A1    Feb. 4, 2010

(51) Int. Cl.
*B62K 25/08* (2006.01)
(52) U.S. Cl. ...................................... 280/276; 188/319.2
(58) Field of Classification Search ................ 188/319.2
See application file for complete search history.

(56) References Cited

U.S. PATENT DOCUMENTS

| 5,478,099 | A | * | 12/1995 | Kawahara | 280/276 |
| 5,634,652 | A | * | 6/1997 | Tsai | 280/276 |
| 5,634,653 | A | * | 6/1997 | Browning | 280/276 |
| 6,105,988 | A | | 8/2000 | Turner et al. | |
| 7,401,800 | B2 | * | 7/2008 | Jordan | 280/276 |
| 7,722,069 | B2 | * | 5/2010 | Shirai | 280/276 |
| 2001/0004036 | A1 | * | 6/2001 | Gonzalez et al. | 188/319.2 |
| 2004/0046354 | A1 | * | 3/2004 | Turner et al. | 280/276 |
| 2008/0041681 | A1 | | 2/2008 | Shipman | |
| 2009/0001684 | A1 | * | 1/2009 | McAndrews et al. | 280/276 |

FOREIGN PATENT DOCUMENTS

JP     52-66161 A    6/1977

* cited by examiner

*Primary Examiner* — Tony H. Winner
(74) *Attorney, Agent, or Firm* — Global IP Counselors, LLP

(57) ABSTRACT

A bicycle suspension system is provided with a first tubular element, a piston, a piston rod, a first sealing member and a switching valve. The piston is coupled to the piston rod, and is slidably disposed in the first tubular element. The first sealing member is disposed in the first tubular element adjacent such that a first air chamber is formed between the piston and the first sealing member. The switching valve is coupled to the first sealing member. The switching valve opens a communication passageway between the first air chamber and a second air chamber to connect the first and second air chambers when in the opened position, and closes the communication passageway between the first air chamber and the second air chamber to separate the first and second air chambers when in the closed position.

19 Claims, 9 Drawing Sheets

BICYCLE SUSPENSION SYSTEM

BACKGROUND OF THE INVENTION

1. Field of the Invention

This invention generally relates to a bicycle suspension system. More specifically, the present invention relates to a bicycle suspension system comprising a switching mechanism between air chambers.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames and forks which typically transmitted the shocks resulting from rough riding surfaces directly to the rider. In other words, most bicycles were not provided with any front or rear suspension. Recently, bicycles, especially mountain bikes (MTB) and all terrain bikes (ATB), were introduced that included front suspension forks to absorb the shocks transmitted to the rider when riding on a rough road. This made riding on rough terrain easier and less physically stressful.

The first suspension forks had about 1½ to 2 inches (38 to 50 mm) of suspension travel. Forks are now available with about 4 to 6 inches (100 to 150 mm) of suspension travel or more. Bicycles with front suspension and rigid, non-suspended rear wheels, or hardtails became popular nearly overnight. On most mountain bicycles, the front fork contains a set of shock absorbers. The suspension travel and handling characteristics vary depending on the type of mountain biking the fork is designed for. For instance, bicycle manufacturers produce different forks for cross-country (XC), downhill and freeride riding.

The shock absorber usually includes a spring and a damper or dashpot. The spring may be implemented with a steel or titanium coil, an elastomer, or even compressed air. The damper is usually implemented by forcing oil to pass through one or more small openings or shim stacks. On some bicycles, the spring, the damper, or both may be adjusted for rider weight, riding style, terrain, or any combination of these or other factors. Also, the two components are sometimes separated with the spring mechanism being in one leg and the damper being in the other leg.

In these bicycles with front suspension forks, it is sometimes desirable to be able to quickly adjust the suspension stroke and/or the spring rate of the spring mechanism as needed and/or desired. Thus, there have been proposals to provide suspensions that include adjust the suspension stroke and/or the spring rate of the spring mechanism.

SUMMARY OF THE INVENTION

One object of the present invention is to provide a bicycle suspension system in which the suspension stroke and/or the spring rate of the spring mechanism can be adjusted in a relatively easy manner. Another object of the present invention is to provide a bicycle suspension system in which the gas supply into a plurality of air chambers can be achieved at the same time while such air chambers can be separated from each other according to need during use.

In accordance with one aspect, a bicycle suspension system is provided that basically comprises a first tubular element, a piston, a piston rod, a first sealing member and a switching valve. The first tubular element includes a first end and a second end. The piston is slidably disposed in the first tubular element. The piston rod has a first end coupled to the piston and a second end extending outwardly of the second end of the first tubular element. The first sealing member is disposed in the first tubular element adjacent the first end of the first tubular element such that a first air chamber is formed between the piston and the first sealing member. The switching valve is coupled to the first sealing member, with the switching valve being movable between a closed position and an opened position. The switching valve opens a communication passageway between the first air chamber and a second air chamber to connect the first and second air chambers when in the opened position, and closes the communication passageway between the first air chamber and the second air chamber to separate the first and second air chambers when in the closed position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
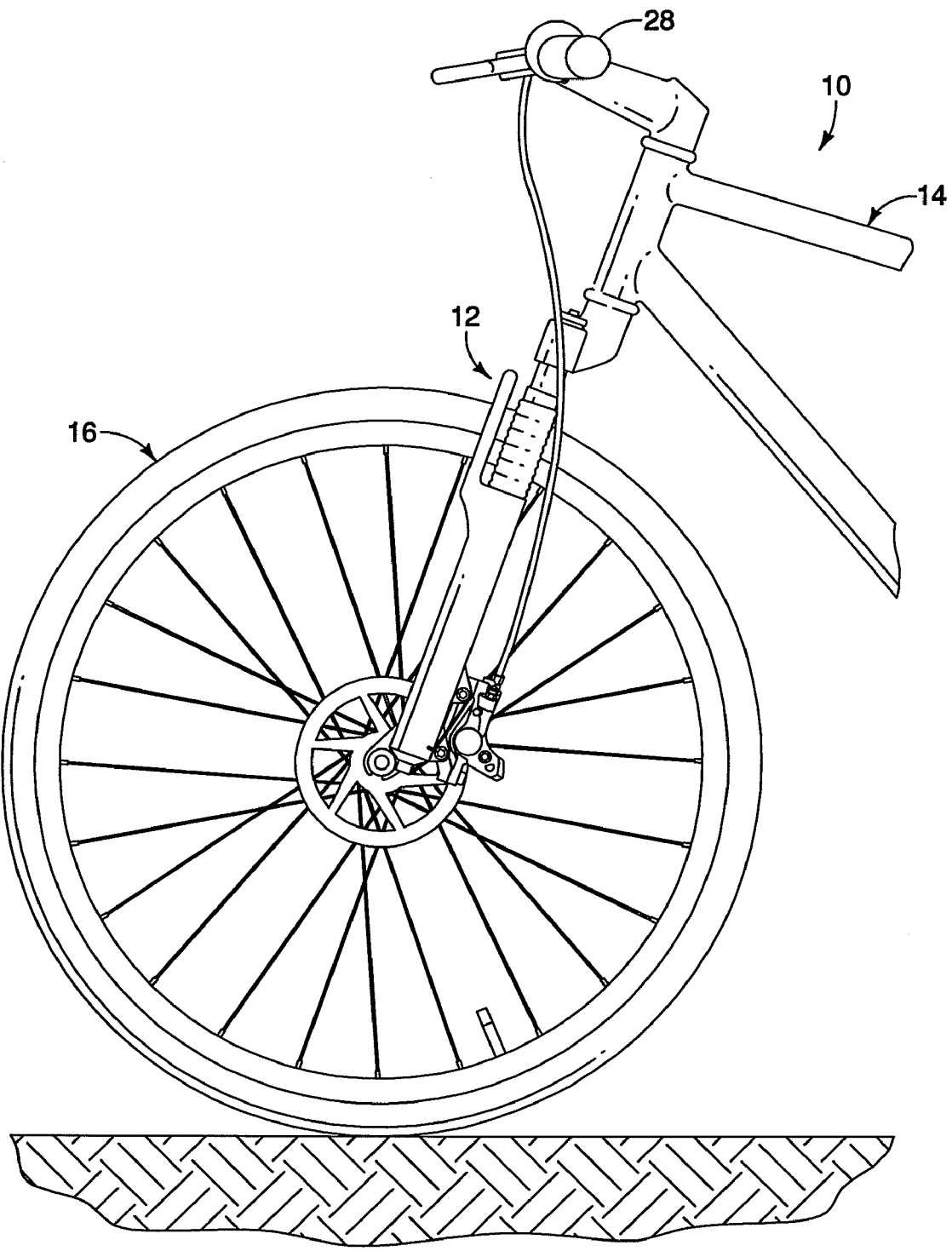
FIG. 1 is a side elevational view of a front portion of a bicycle equipped with a front suspension fork in accordance with one embodiment.

Referring initially to FIG. 1, a front end of a bicycle 10 is illustrated that is equipped with a front suspension fork 12 in accordance with a first embodiment. Basically, the front suspension fork 12 has an upper end that is rotatably mounted to a front part (head tube) of a bicycle frame 14 in a conventional manner, and a lower end that rotatably supports a front wheel 16. The rest of the bicycle 10 can be any type of bicycle, and thus, the bicycle 10 will not be discussed or illustrated in further detail herein.

Figure 2:
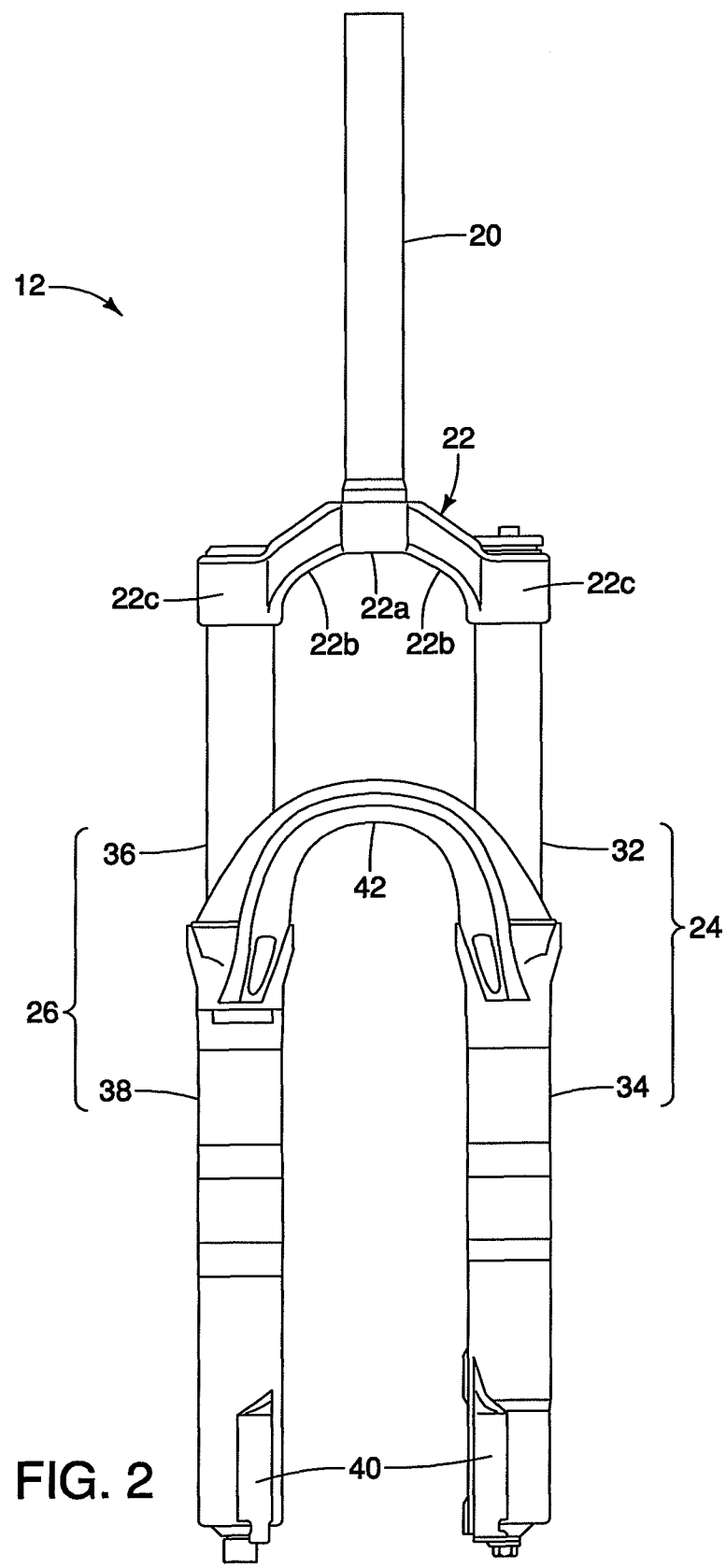
FIG. 2 is a front elevational view of the front suspension fork illustrated in FIG. 1.

As seen in FIG. 2, the front suspension fork 12 basically includes a steerer tube 20, a crown 22, a first or left leg 24 and a second or right leg 26. The first or left leg 24 constitutes a first or right suspension assembly, while the second or right leg 26 constitutes a second or left suspension assembly. The crown 22 is secured to a bottom end of the steerer tube 20. The legs 24 and 26 are secured at opposite lateral end of the crown 22. Typically, a handlebar 28 is fixedly mounted to the steerer tube 20 at its upper end for steering the front wheel 16 as seen in FIG. 1. Thus, the steerer tube 20 provides a means for connection of the handlebar 28 to the front suspension fork 12.

The steerer tube 20 includes, for example, a metal pipe member. The steerer tube 20 is rotatably supported by the head tube of the frame 14. The top end of the steerer tube 20 is fixed to the handlebar 28. The bottom end of the steerer tube 20 is inserted in the center of the crown 22, and is secured therein using an appropriate means such as press fitting, screw fitting or welding.

The crown 22 constitutes a fork shoulder unit that includes, for example, a metal molded member. The crown 22 has a cylindrical column securing portion 22a at its center for mounting the steerer tube 20. The crown 22 also has a pair of arms 22b that extend laterally from the column securing portion 22a while curving downward. The free ends of the arms 22b have cylindrical suspension mounting portions 22c for clamping the upper ends of the legs 24 and 26, respectively.

The left leg 24 includes a left upper tubular element 32 telescopically received in a left lower tubular element 34. In other words, the upper tubular element 32 includes a top portion and a bottom portion, with the bottom portion of the upper tubular element 32 being telescopically disposed within a top portion of the lower tubular element 34 such that the upper tubular element 32 is telescopically movable with respect to the lower tubular element 34. The hollow interiors of the upper and lower tubular elements 32 and 34 form an internal area of the upper and lower tubular elements 32 and 34 that changes in area when the upper and lower tubular elements 32 and 34 are moved together (compression) or moved apart (expansion or rebound).

Similarly, the right leg 26 includes a right upper tubular element 36 telescopically received in a right lower tubular element 38. In other words, the upper tubular element 36 includes a top portion and a bottom portion, with the bottom portion of the upper tubular element 36 being telescopically disposed within a top portion of the lower tubular element 38 such that the upper tubular element 36 is telescopically movable with respect to the lower tubular element 38. The hollow interiors of the upper and lower tubes 36 and 38 form an internal area of the upper and lower tubes 36 and 38 that changes in area when the upper and lower tubes 36 and 38 are moved together (compression) or moved apart (expansion or rebound).

The crown 22 connects the right upper tubular element 32 to the left upper tubular element 36 thereby connecting the left leg 24 to the right leg 26 of the suspension fork 12. Each of the lower tubular elements 34 and 38 includes a drop out 40 for connecting the front wheel 16 to the fork 12. An arch 42 connects the left lower tubular element 34 and the right lower tubular element 38 to provide strength and minimize twisting thereof. Preferably, the left lower tubular element 34, the right lower tubular element 38 and the arch 42 are formed as a unitary piece. However, the left lower tubular element 34, the right lower tubular element 38 and the arch 42 can be separate pieces and connected by a suitable fastening method.

The suspension fork 12 can also be provided with other conventional features. For example, disc brake bosses (not shown) can be provided on one or both of the lower tubular elements 34 and 38, as needed and/or desired, for mounting a disc brake caliper. Of course, it will be apparent to those skilled in the art from this disclosure that the suspension fork 12 can be configured to mount other types of braking systems as needed and/or desired.

Figure 3:
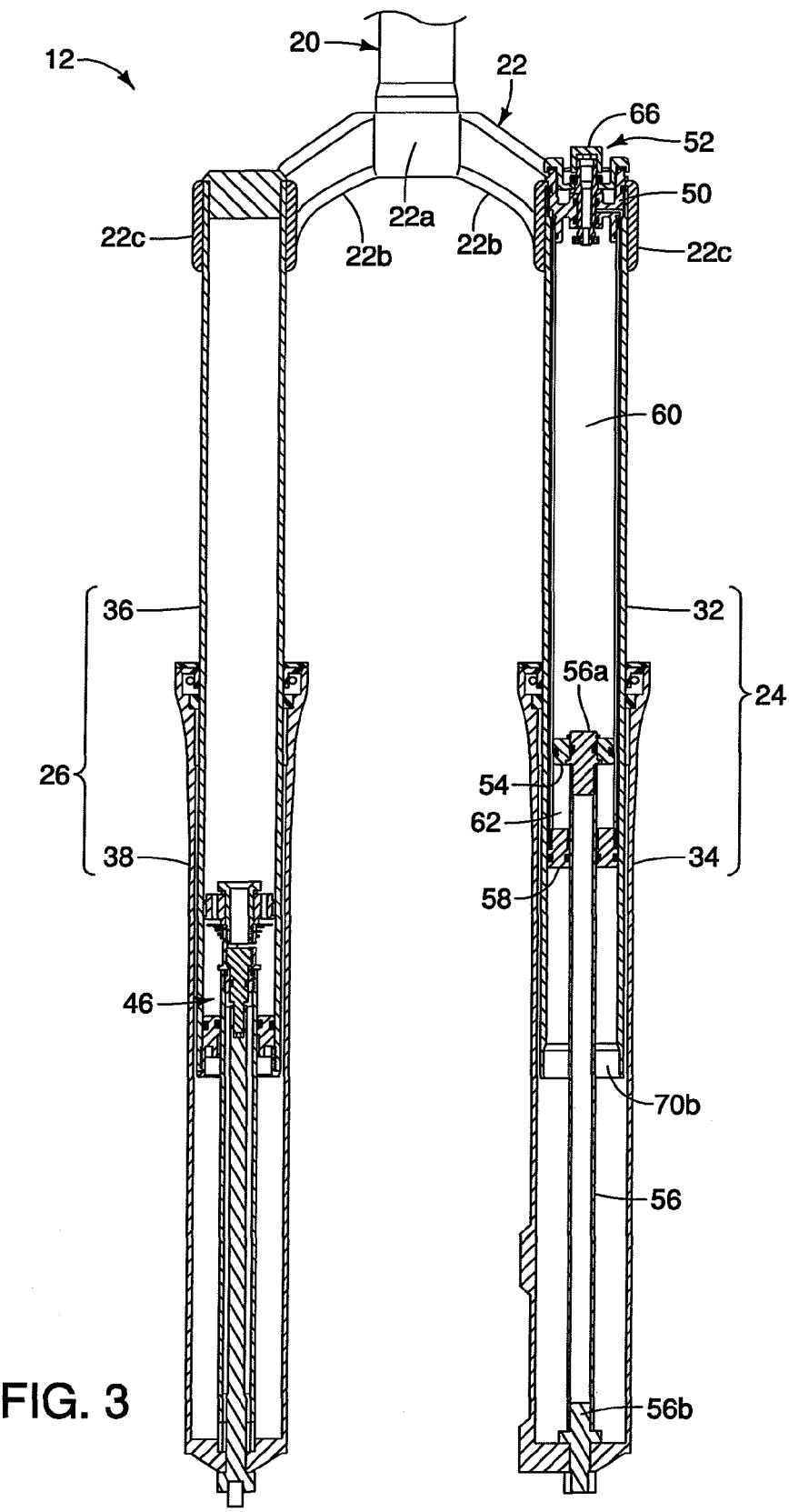
FIG. 3 is a longitudinal cross sectional view of the front suspension fork illustrated in FIGS. 1 and 2.

Referring now to FIG. 3, a longitudinal cross sectional view of the front suspension fork 12 is illustrated to show various internal components of the front suspension fork 12. As previously mentioned, the upper tubular elements 32 and 36 are capable of telescopic motion relative to the lower tubular elements 34 and 38, respectively. Each of the lower tubular elements 34 and 38 has a closed lower end and an open upper end. The lower ends of the upper tubular elements 32 and 36 are received into the open upper ends of the lower tubular elements 34 and 38, respectively. Each of the fork legs 24 and 26 preferably includes a sealing/bushing arrangement positioned between the respective upper tubular elements 32 and 36 and the lower tubular elements 34 and 38 at the location where the upper tubular elements 32 and 36 enter the open end of the lower tubular elements 34 and 38 in a conventional manner. Each of the upper tubular elements 32 and 36 constitutes a first tubular element, while each of the lower tubular elements 34 and 38 constitutes a second tubular element that is telescopically arranged with respect to the corresponding first tubular element.

Basically, the left leg 24 constitutes an air-spring mechanism, while the right leg 26 constitutes a damping mechanism. Of course, it will be apparent to those skilled in the bicycle field that the air-spring mechanism can be in the right leg and the damping mechanism can be in the left leg, if needed and/or desired. The air-spring mechanism provides resistance to compression of the suspension fork 12 and releases energy stored during compression to cause the suspension fork 12 to extend, or rebound. The damping mechanism includes a damping unit 46 that provides a damping force, which resists both compression and rebound motion, to slow the motion of the suspension fork 12 in either direction.

Still referring to FIG. 3, the air-spring mechanism within the left leg 24 is basically formed by providing the upper tubular element 32 with a first or upper sealing member 50, a switching valve 52, a piston 54, a piston rod 56 and a second or lower sealing member 58. Basically, a positive air spring chamber 60 is formed in the upper tubular element 32 between the upper sealing member 50 and the piston 54, and a negative air spring chamber 62 is formed in the upper tubular element 32 formed between the piston 54 and the lower sealing member 58. The positive air spring chamber 60 can be broadly considered a first air chamber, while the negative air spring chamber 62 can be broadly considered a second air chamber. When the upper and lower tubular elements 32 and 34 are compressed together, the air within the positive air spring chamber 60 of the left leg 24 compresses, while the air within the negative air spring chamber 62 of the left leg 24 expands. Thus, the air spring works by utilizing the characteristic of compressed air to resist further compression. Since the "spring" of the suspension fork 12 is provided by the compressed air rather than a coil of metal the suspension can be made lighter. Also with this type of fork design, the spring rate can easily be adjusted by adjusting the pressure of the air in the spring. This allows the suspension fork 12 to be effectively tuned to a rider's weight.

Figure 4:
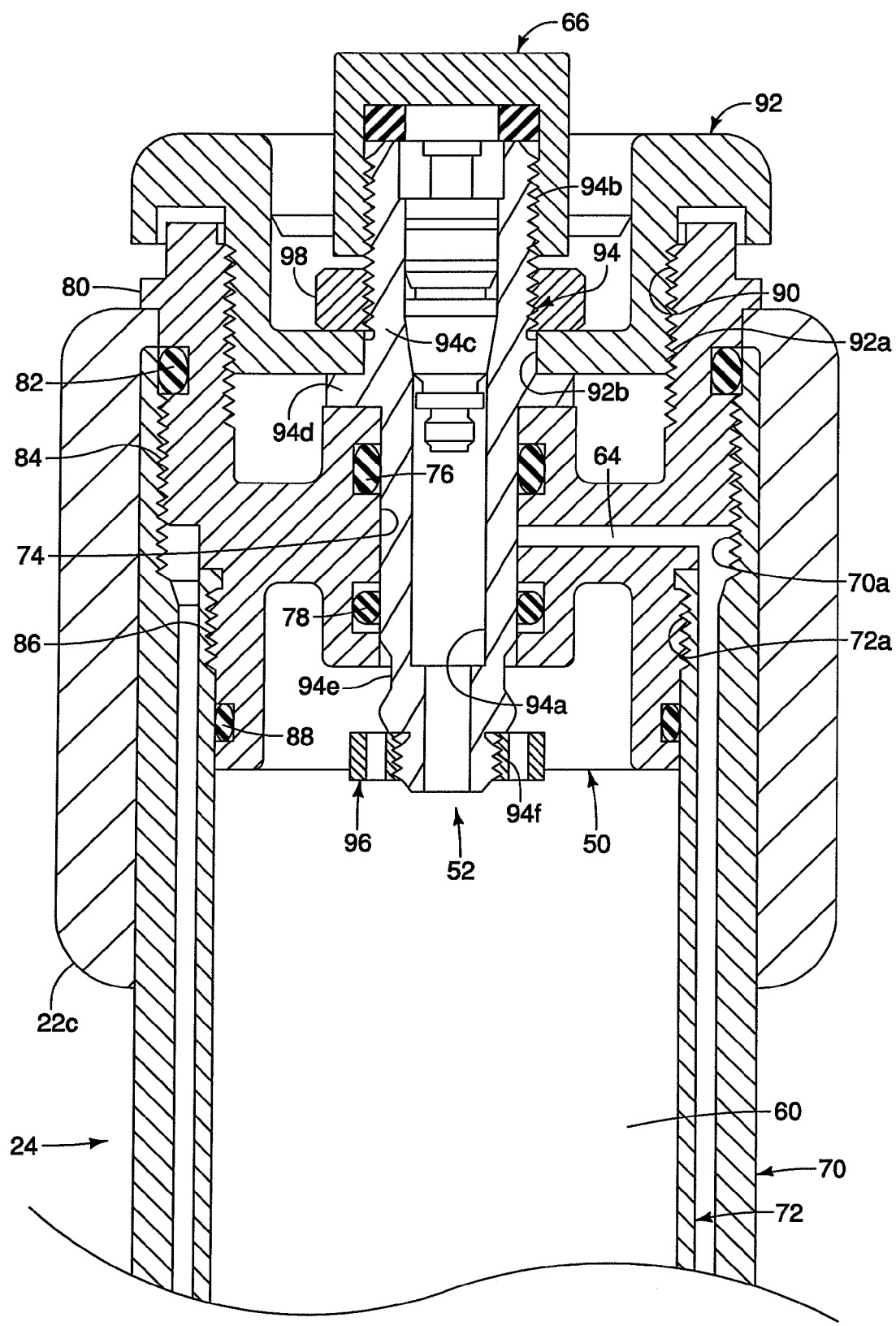
FIG. 4 is an enlarged, longitudinal cross sectional view of a top portion of the front suspension fork illustrated in FIGS. 1 to 3, with the switching valve in a closed position.
Figure 5:
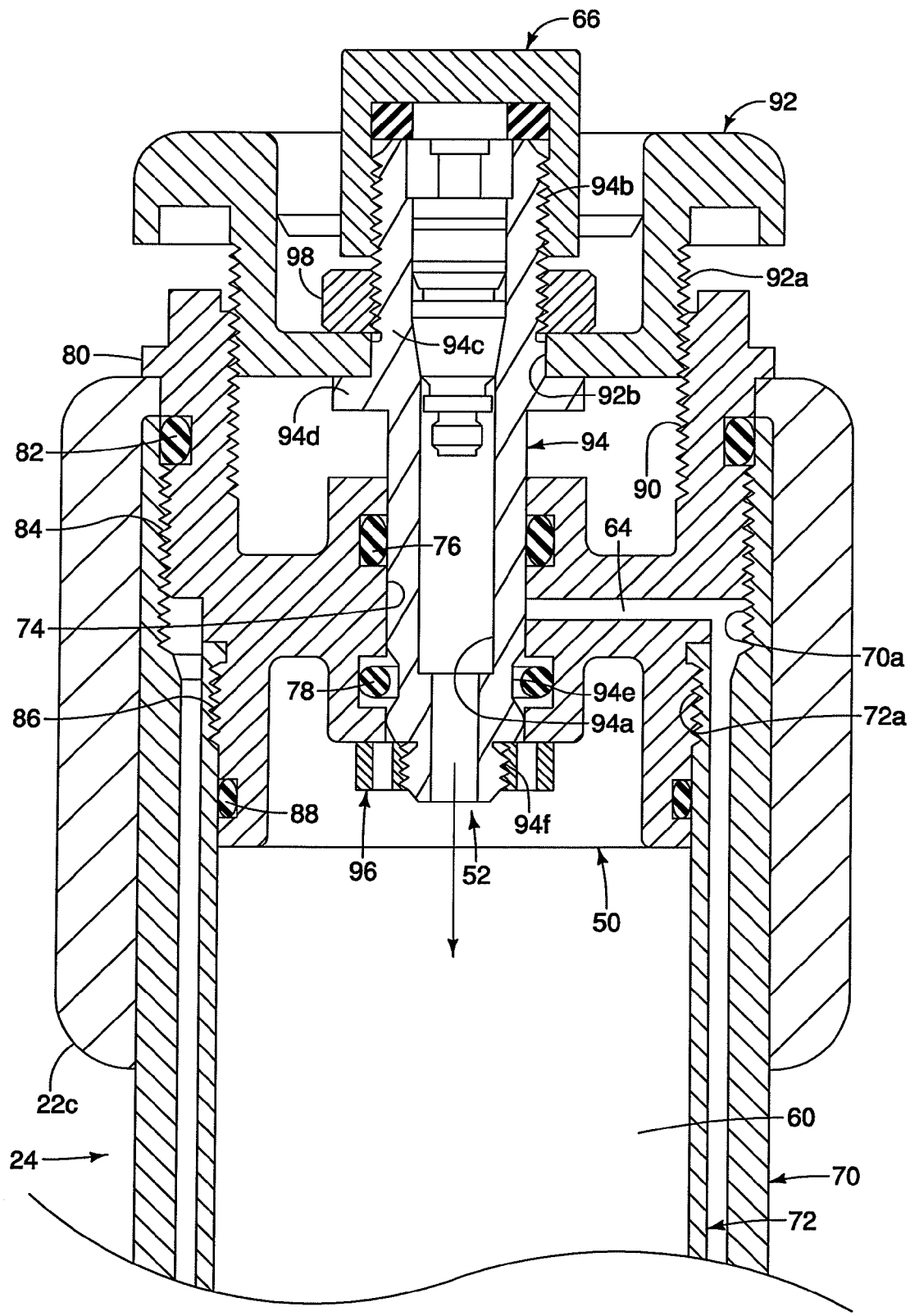
FIG. 5 is an enlarged, longitudinal cross sectional view, similar to FIG. 4, of the top portion of the front suspension fork illustrated in FIGS. 1 to 4, but with the switching valve in an opened position.

In this first embodiment, the switching valve 52 is configured to selectively open and close a communication passageway 64 of the upper sealing member 50 that interconnects the positive air spring chamber 60 and the negative air spring chamber 62. In other words, as seen in FIG. 4, when the switching valve 52 is in the closed position, the communication passageway 64 separates the positive air spring chamber 60 from the negative air spring chamber 62 so that fluid (e.g., air) does not flow between the two chambers 60 and 62. As seen in FIG. 5, when the switching valve 52 is in the opened position, the communication passageway 64 communicates the positive air spring chamber 60 with the negative air spring chamber 62 so that fluid (e.g., air) can freely flow between the two chambers 60 and 62. The switching valve 52 is switched between the in the closed and opened positions by axially rotating the switching valve 52.

Preferably, the switching valve 52 has an air filling valve 66 axially mounted for supplying pressurized air to the positive and negative air-spring chambers 60 and 62 of the left leg 24. In particular, when the switching valve 52 is in the opened position, it is possible to supply fluid (e.g., air) into both of the positive and negative air-spring chambers 60 and 62 at the same time via the air filling valve 66 by rotating the switching valve 52 to the opened position. The air filling valve 66 is a conventional valve that is well known in the art, and thus, will not be discussed and/or illustrated in further detail herein, Furthermore, by telescopically moving the upper and lower tubular elements 32 and 34 relative to each other when the switching valve 52 is in the opened position as illustrated in FIG. 5, it is possible to change a suspension stroke as needed and/or desired. In other words, if a user moves the switching valve 52 from the opened position to the closed position while keeping the upper and lower tubular elements 32 and 34 in a desired position for a desired stroke length, then the stroke length can be fixed. Also, when the switching valve 52 is left in the opened position, the effective volume of the positive air spring chamber 60 will increase and thus, an effective spring rate of the positive air spring chamber 60 will decrease with respect to the closed position of the switching valve 52.

Figure 6:
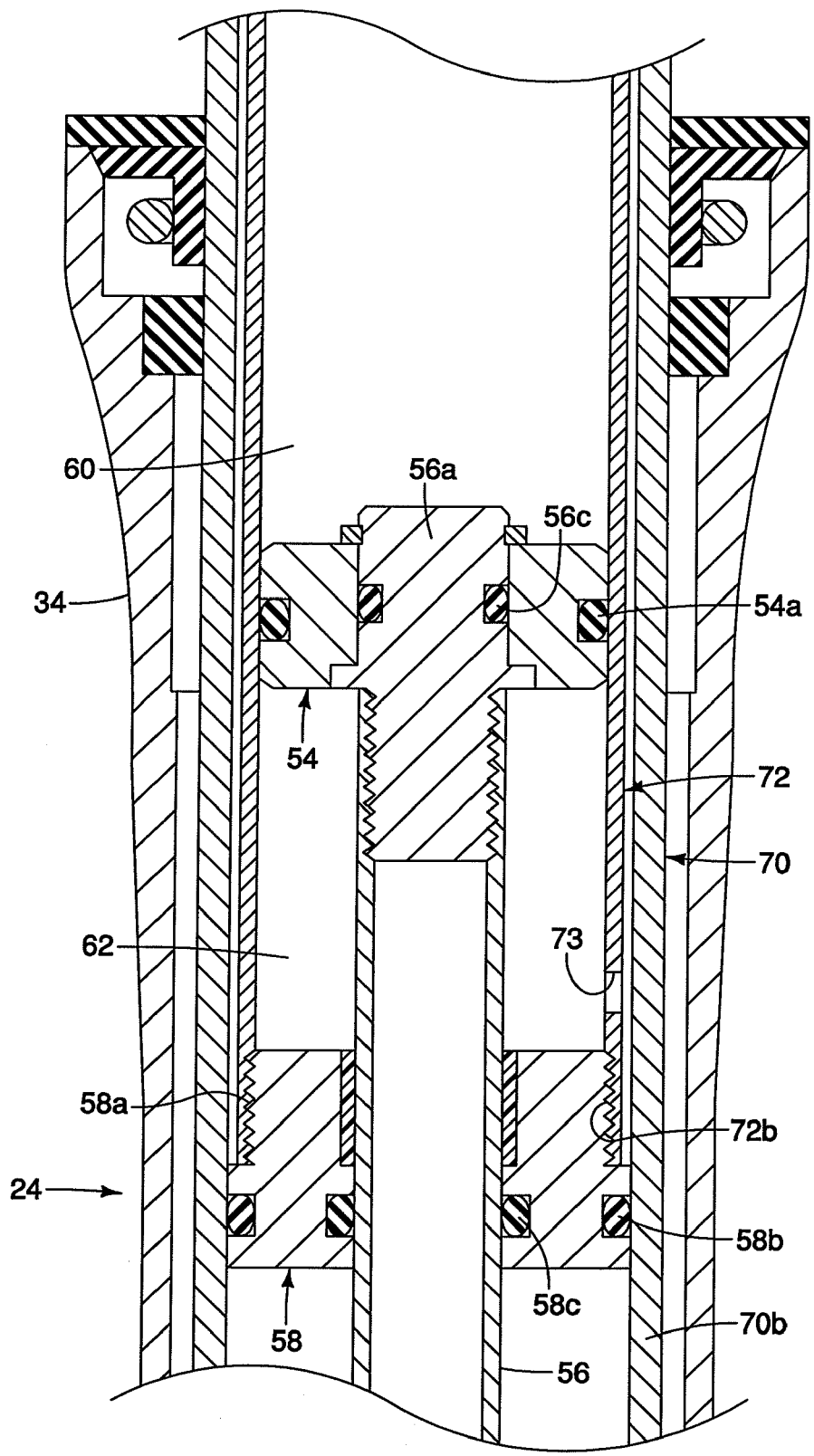
FIG. 6 is an enlarged, longitudinal cross sectional view of a middle portion of the front suspension fork illustrated in FIGS. 1 to 5, showing the second chamber.

Preferably, the upper tubular element 32 includes an outer tube 70 and an inner tube 72 with part of the negative air spring chamber 62 (e.g., the second air chamber) being formed between the outer and inner tubes 70 and 72 in this embodiment. In particular, as seen in FIG. 6, the inner tube 72 has a radially extending opening 73 that is located in the axial direction of the inner tube 72 between the piston 54 and the lower sealing member 58 such that the space between the outer and inner tubes 70 and 72 communicates with the space inside the inner tube 72 between the piston 54 and the lower sealing member 58.

As seen in FIG. 4, the upper end of the outer tube 70 has an internal thread 70a that is threaded on to the first or upper sealing member 50. As seen in FIG. 3, the outer tube 70 has its lower end 70b slidably engaged with an interior surface of the lower tubular element 34. Likewise, as seen in FIG. 4, the upper end of the inner tube 72 has an internal thread 72a that is threaded on to the first or upper sealing member 50. As seen in FIG. 6, the lower end of the inner tube 72 has an internal thread 72b that is threaded on to the second or lower sealing member 58. Thus, the upper and lower sealing members 50 and 58 seal the opposite ends of the outer and inner tubes 70 and 72, with the piston 54 slidably engaged with the inner tube 72.

The first or upper sealing member 50 is disposed in the upper tubular element 32 (e.g., the first tubular element) adjacent the first or upper end of the upper tubular element 32 such that the positive air spring chamber 60 (e.g., a first air chamber) is formed between the piston 54 and the first or upper sealing member 50. Thus, the upper sealing member 50 closes the upper end of the upper tubular element 32 to provide a fluid-tight seal between the upper sealing member 50 and the inner surface of the upper tubular element 32. Since the top portion of the lower tubular element 34 is telescopically movable with the bottom portion of the upper tubular element 32, an adjustable internal area is formed within the upper and lower tubular elements 32 and 34.

As best seen in FIGS. 4 and 5, the upper sealing member 50 is a tubular part that has an axially extending channel 74 in the center for rotatably receiving the switching valve 52 therein. The communication passageway 64 of the upper sealing member 50 extends in a radial direction from the channel 74. When the switching valve 52 is in the opened position, the fluid (e.g., air) from the positive and negative air-spring chambers 60 and 62 communicate via the communication passageway 64 and the channel 74. The channel 74 has a pair of seals 76 and 78 disposed between an interface of the switching valve 52 and an inner surface of the channel 74. The seal 76 is disposed in the channel 74 above the communication passageway 64, while the seal 78 is disposed in the channel 74 below the communication passageway 64. When the switching valve 52 is in the closed position, both of the seals 76 and 78 contact the switching valve 52 to isolate the positive and negative air-spring chambers 60 and 62 from each other and to prevent the fluid (e.g., air) from leaking out of the upper tubular element 32 (e.g., the first tubular element) through the channel 74. When the switching valve 52 is in the opened position, only the seal 76 contacts the switching valve 52 such that the positive and negative air spring chambers 60 and 62 are fluidly connected, and such that the seal 76 prevents the fluid (e.g., air) from leaking out of the upper tubular element 32 (e.g., the first tubular element) through the channel 74.

Still referring to FIGS. 4 and 5, the upper sealing member 50 has an outer surface that basically includes an annular flange or abutment 80, a first sealing ring 82, a first external thread 84, a second external thread 86 and a second sealing ring 88. The annular flange or abutment 80 functions to limit the amount that the upper sealing member 50 can be inserted into the upper end of the upper tubular element 32. In particular, the abutment 80 has a diameter that is larger than the inner diameter of the outer tube 70. When the upper sealing member 50 is coupled to the upper end of the upper tubular element 32, the first external thread 84 threadedly engage the internal thread 70a of the outer tube 70 and the second external thread 86 threadedly engage the internal thread 72a of the inner tube 72. Also the first sealing ring 82 contacts the inner surface of the outer tube 70 to create a fluid tight seal therebetween, and the second sealing ring 88 contacts the inner surface of the inner tube 72 to create a fluid tight seal therebetween.

The upper sealing member 50 further includes an internal thread 90 for coupling the switching valve 52 thereto. The internal thread 90 of the upper sealing member 50 retains the switching valve 52 to the upper sealing member 50, but also allows the switching valve 52 to be rotated relative to the upper sealing member 50. Also when the switching valve 52 is rotated relative to the upper sealing member 50, the switching valve 52 will move axially relative to the upper sealing member 50 such that the switching valve 52 contacts the seal 78 in the closed position and does not contact the seal 78 in the opened position.

The switching valve 52 basically includes a hand operated actuator 92, a valve member 94 and a stopper 96. The hand operated actuator 92 has an external thread 92a that threadedly engages the internal thread 90 of the upper sealing member 50 and a non-circular center hole 92b that non-rotatably engages the valve member 94. In this illustrated embodiment, the hand operated actuator 92 is fixedly secured to the valve member 94 by a nut 98. Thus, the operated actuator 92 and the valve member 94 are integrated together to form a unit. With this arrangement, when the switching valve 52 is rotated relative to the upper sealing member 50, the switching valve 52 will move axially relative to the upper sealing member 50 such that the switching valve 52 can selectively open and close the communication passageway 64.

The valve member 94 is basically a tubular member with a center bore 94a that constitutes a gas supply port in fluid communication with the positive air spring chamber 60. In other words, the center bore 94a (e.g., the gas supply port) is provided with the air filling valve 66 for supplying a pressurized fluid (e.g., air) into the positive air spring chamber 60. The outer surface of the valve member 94 has a first externally threaded portion 94b at its upper end, a non-circular shaft portion 94c, an annular flange 94d, an annular recess 94e and a second externally threaded portion 94f at its lower end. The externally threaded portion 94b is provided at the upper end of the valve member 94 to removably secure the air filling valve 66 to the valve member 94. The externally threaded portion 94b is dimensioned for receiving the nut 98. When the valve member 94 is disposed in the non-circular center hole 92b of the hand operated actuator 92, the non-circular shaft portion 92b is engaged with the non-circular shaft portion 94c of the valve member 94 with the nut 98 contacting an upper side of the hand operated actuator 92 and the annular flange 94d contacting a lower side of the hand operated actuator 92. In this way, the hand operated actuator 92 and the valve member 94 are non-movably secured together.

In this illustrated embodiment, the stopper 96 is threaded onto the externally threaded portion 94f at the lower end of the valve member 94 to prevent the switching valve 52 from being disconnected from the upper sealing member 50 when the hand operated actuator 92 is rotated from the closed position to the opened position. In other words, when the hand operated actuator 92 is rotated, the external thread 92a will engage the internal thread 90 of the upper sealing member 50 so that the switching valve 52 will move axially relative to the upper sealing member 50. The annular recess 94e of the valve member 94 is disposed such that when the hand operated actuator 92 is rotated to the point in which that the stopper 96 contacts a lower surface of the upper sealing member 50 (i.e., the opened position), the recess 94e of the valve member 94 aligns with the seal 78 and to unseal the interface between the outer surface of the valve member 94 and the inner surface of the channel 74 of the upper sealing member 50 below the seal 76. In other words, when the switching valve 52 is in the opened position, the seal 78 does not contact the outer surface of the valve member 94. Thus, in this opened position of the switching valve 52, the pressurized fluid (e.g., air) can flow from the positive air spring chamber 60 to the negative air spring chamber 62 via the channel 74 and the communication passageway 64. However, the seal 76 prevents the pressurized fluid (e.g., air) from leaking out of the upper end of the upper tubular element 32.

Referring to FIG. 6, the piston 54 is slidably disposed in the inner tube 72 and separates the positive and negative air-spring chambers 60 and 62 of the left leg 24. In particular, the piston 54 has a seal 54a that contacts the inner surface of the inner tube 72 to create a fluid tight seal therebetween. The piston 54 moves relative to the upper tubular element 32 in response to relative telescopic movement between the upper and lower tubular elements 32 and 34. The piston rod 56 is a rigid rod that supports the piston 54 within the upper tubular element 32 and slidably engages the lower sealing member 58. In particular, as seen in FIG. 3, the piston rod 56 has a first or upper end 56a fixedly coupled to the piston 54 and a second or lower end 56b fixedly coupled to the lower tubular element 34. A seal 56c is disposed on the upper end 56a of the piston rod 56 between the piston 54 and the upper end 56a of the piston rod 56. Thus, the lower end 56b of the piston rod 56 extends outwardly of the lower end of the upper tubular element 32 (e.g., the first tubular element) such that the lower end of the upper tubular element 32 is spaced from the bottom end of the lower tubular element 34 (e.g., the second tubular element). In other words, the lower tubular element 34 has its upper end telescopically receives in the lower end of the upper tubular element 32 and its lower end fixedly coupled to the lower end 56b of the piston rod 56 so that the piston 54 and the piston rod 56 move with the lower tubular element 34 relative to the upper tubular element 32.

Referring again to FIG. 6, the second or lower sealing member 58 is secured to the lower end of the inner tube 72 at a location that is spaced upwardly from the lower end of the outer tube 70. In particular, the internal thread 72b on the lower end of the inner tube 72 engages an external thread 58a of the lower sealing member 58. The lower sealing member 58 also has an outer seal 58b that contacts the inner surface of the outer tube 70 to create a fluid tight seal therebetween. An inner seal 58c that contacts the outer surface of the piston rod 56 to create a fluid tight seal therebetween. Thus, the negative air spring chamber 62 is primarily formed between the piston 54 and the lower sealing member 58, which is disposed in the upper tubular element 32 between the piston 54 and the lower end of the upper tubular element 32 with the piston rod 56 extending through the lower sealing member 58. As mentioned above, the negative air spring chamber 62 also includes the space between the inner and outer tubes 70 and 72. Thus, the negative air spring chamber 62 partly extends up to the vicinity of the upper sealing member 50. Therefore, when the switching valve 52 is in the opened position, it is possible to supply fluid (e.g., air) into both of the positive and negative air-spring chambers 60 and 62 at the same time via the air filling valve 66 by rotating the switching valve 52 to the opened position.

Figure 7:
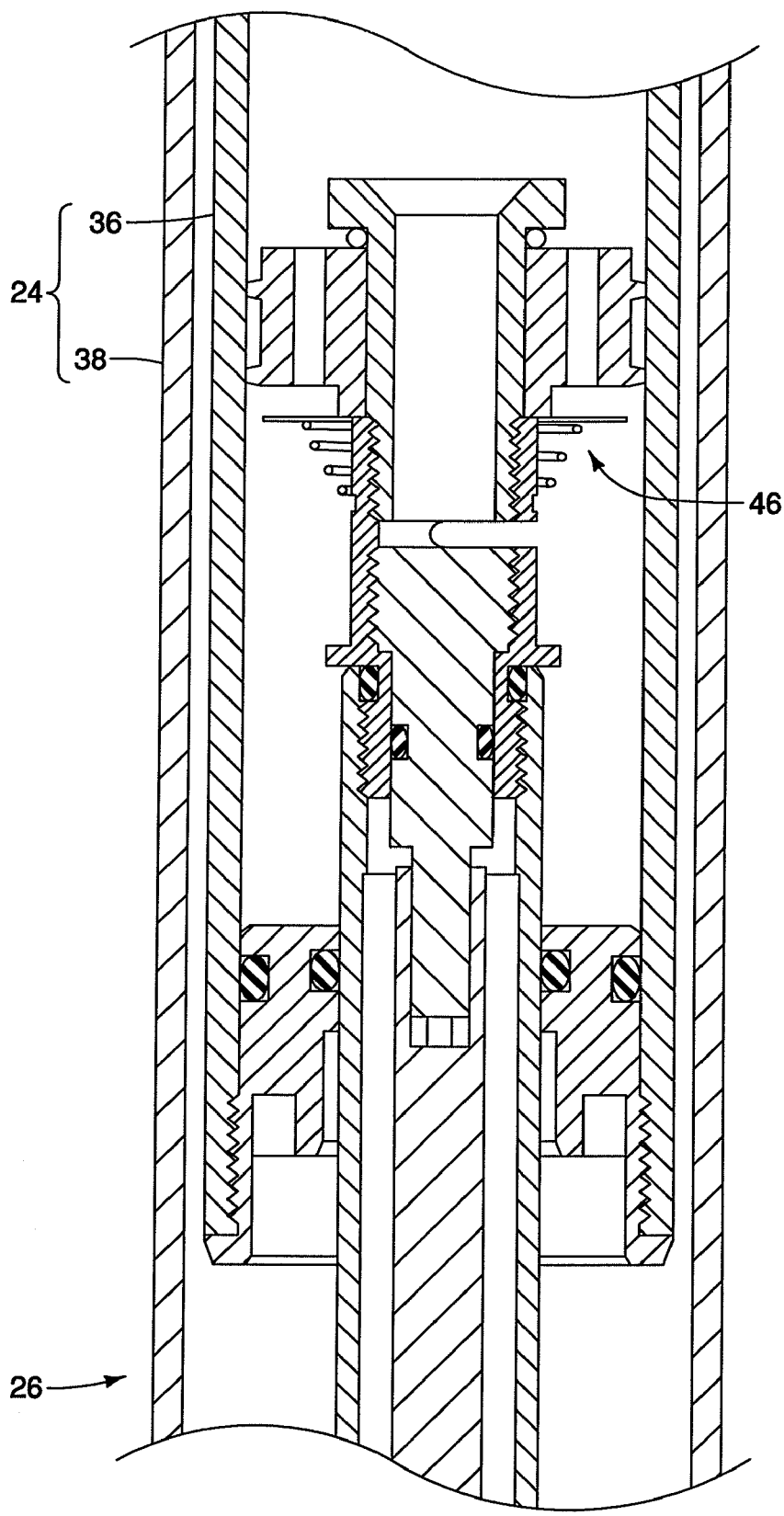
FIG. 7 is an enlarged, longitudinal cross sectional view of a middle portion of the front suspension fork illustrated in FIGS. 1 to 5, showing the damping unit of the front suspension fork.

Referring to FIGS. 3 and 7, the damping unit 46 is one example of a damping mechanism formed within the right leg 26 for controlling the damping force of the suspension fork 12. The damping unit 46 provides a damping force, which resists both compression and rebound motion, to slow the motion of the suspension fork 12 in either direction. The damping unit 46 is positioned at the lower portion of the upper tubular element 36. Since damping mechanisms are well known, the damping unit 46 shown within the right leg 26 will not be discussed and/or illustrated in detail.

Second Embodiment

Figure 8:
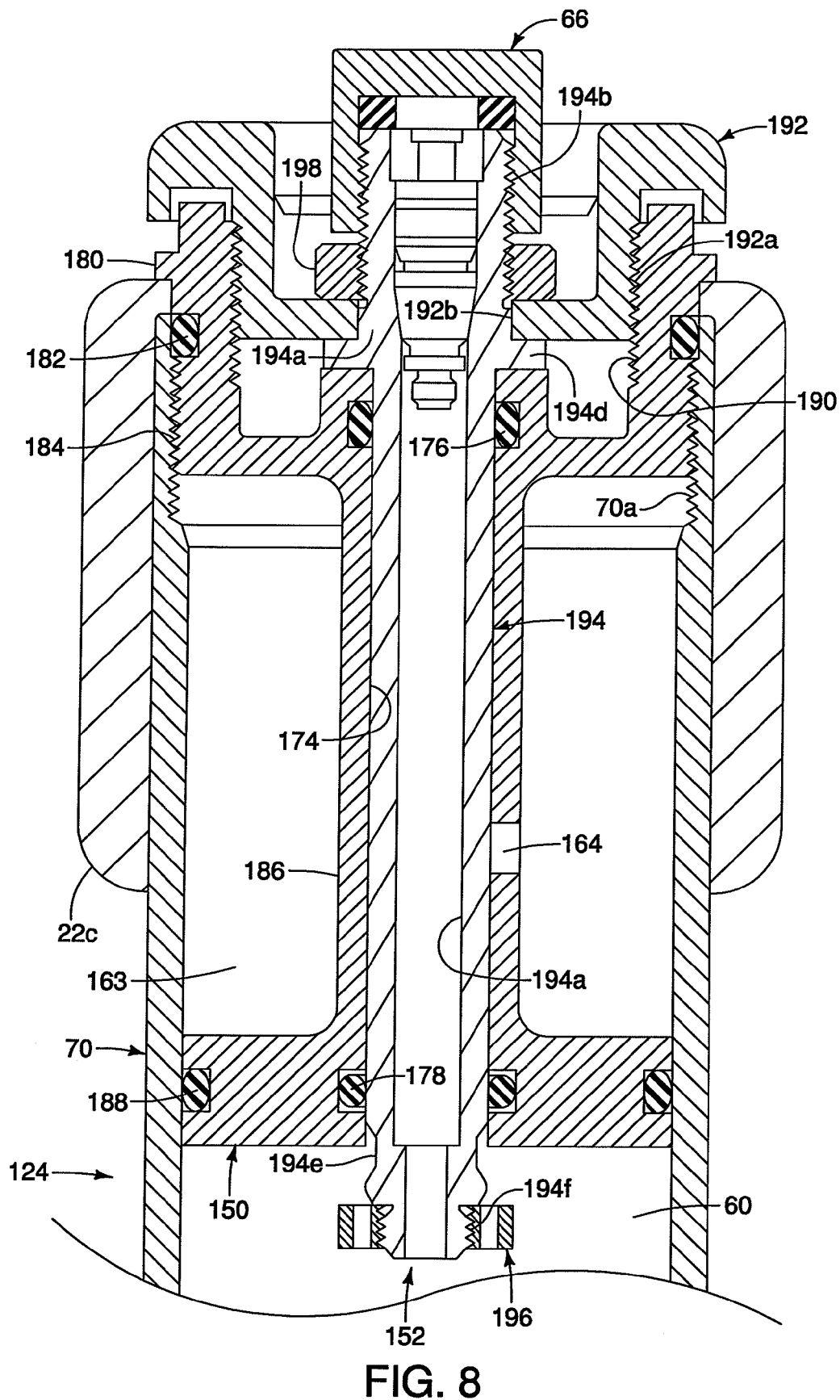
FIG. 8 is an enlarged, longitudinal cross sectional view of a top portion of a left leg of a front suspension fork in accordance with a second embodiment, with the switching valve in a closed position.
Figure 9:
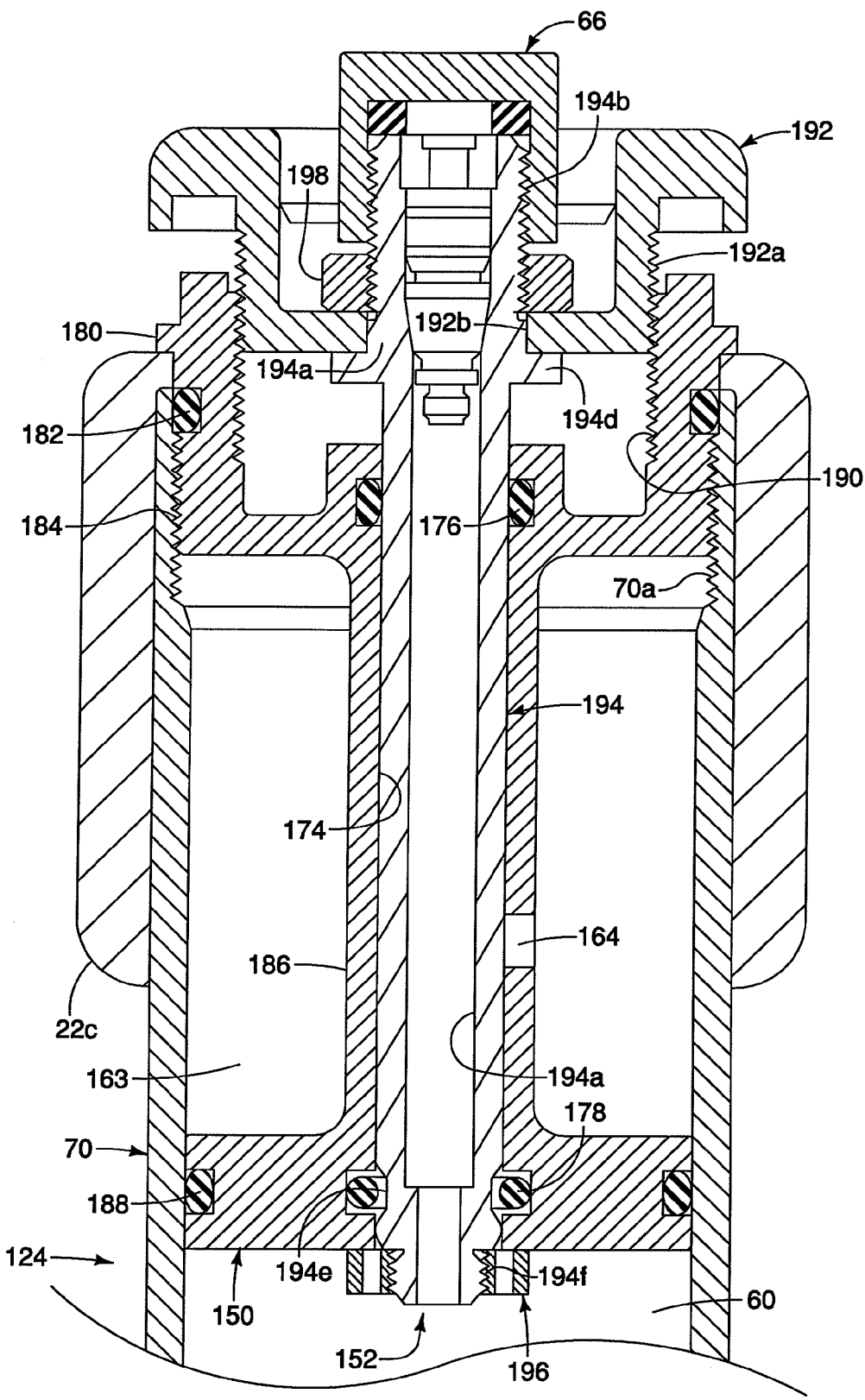
FIG. 9 is an enlarged, longitudinal cross sectional view, similar to FIG. 8, of the top portion of the front suspension fork in accordance with the second embodiment, but with the switching valve in an opened position.

Referring now to FIGS. 8 to 9, a modified left leg 124 in accordance with a second embodiment will now be explained. The modified left leg 124 is used with the suspension fork 12 by substituting replaces the left leg 24, discussed above, with the modified left leg 124. The modified left leg 124 is identical to the left leg 24 of the suspension fork 12, except as described below. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the embodiment, the negative air-spring chamber 62 does not extend to the upper part of the spring unit (e.g., chambers 60 and 62), unlike the first embodiment. Instead, an additional positive air-spring chamber 163 is provided at the upper part of the spring unit. In this embodiment, it is possible to change the total volume of the positive air-spring chamber 60 by selectively separating and communicating the positive air-spring chamber 60 from and with the additional positive air-spring chamber 163 according to need so that the characteristics of the positive air-spring can be adjusted.

In this embodiment, the upper tubular element uses only the outer tube 70 of the first embodiment. Thus, this embodiment eliminates the inner tube 72 of the first embodiment. In view of this change, the outer diameters of the piston 54 and the lower sealing member 58 are increases slightly to seal directly against the inner surface of the outer tube 70. Thus, the negative air spring chamber of this second embodiment does not extend upwardly past the piston 54.

Also in this embodiment, the upper end of the outer tube 70 is sealed off by using a modified first or upper sealing member 150 having a modified switching valve 152. The modified upper sealing member 150 is essentially identically to the upper sealing member 50, except the upper sealing member 150 is longer in this second embodiment and includes the additional positive air-spring chamber 163. The modified switching valve 152 is essentially identically to the switching valve 52, except that the shaft portion of the modified switching valve 152 is longer in this second embodiment connects the positive air spring chamber 60 to the additional positive air-spring chamber 163.

Still referring to FIGS. 8 and 9, the upper sealing member 150 has an outer surface that basically includes an annular flange or abutment 180, a first sealing ring 182, an external thread 184, an annular recess 186 and a second sealing ring 188. The annular flange or abutment 180 functions to limit the amount that the upper sealing member 150 can be inserted into the upper end of the tube 70. In particular, the abutment 180 has a diameter that is larger than the inner diameter of the tube 70. When the upper sealing member 150 is coupled to the upper end of the tube 70, the external thread 184 threadedly engages the internal thread 70a of the tube 70. Also the sealing rings 182 and 188 contact the inner surface of the tube 70 to create a fluid tight seal therebetween. The annular recess 186 is located between the sealing rings 182 and 188 to form the additional positive air-spring chamber 163 around a tubular part of the upper sealing member 150 that receives the switching valve 152. The upper end of the upper sealing member 150 constitutes an end part. The lower end of the upper sealing member 150 constitutes a partition part that separates the positive air spring chamber 60 from the additional positive air-spring chamber 163. The tubular part of the upper sealing member 150 connects the end part and the partition part together, with the tubular part having an opening or communication passageway 164 connecting the additional positive air-spring chamber 163 to the positive air spring chamber 60 via the channel 174. Thus, the additional positive air-spring chamber 163 is disposed between the positive air spring chamber 60 and the upper end of the tube 70.

The upper sealing member 150 further includes an internal thread 190 for coupling the switching valve 152 thereto. The internal thread 190 of the upper sealing member 150 retains the switching valve 152 to the upper sealing member 150, but also allows the switching valve 152 to be rotated relative to the upper sealing member 150. Also when the switching valve 152 is rotated relative to the upper sealing member 150, the switching valve 152 will move axially relative to the upper sealing member 150 such that the switching valve 152 contacts the seal 178 in the closed position and does not contact the seal 178 in the opened position.

The switching valve 152 basically includes a hand operated actuator 192, a valve member 194 and a stopper 196. The hand operated actuator 192 has an external thread 192a that threadedly engages internal thread 190 of the upper sealing member 150 and a non-circular center hole 192b that non-rotatably engages the valve member 194. In this illustrated embodiment, the hand operated actuator 192 is fixedly secured to the valve member 194 by a nut 198. Thus, the operated actuator 192 and the valve member 194 are integrated together to form a unit. With this arrangement, when the switching valve 152 is rotated relative to the upper sealing member 150, the switching valve 152 will move axially relative to the upper sealing member 150 such that the switching valve 152 can selectively open and close the communication passageway 164 to selectively connected the additional positive air-spring chamber 163 with the positive air spring chamber 60. When the switching valve 152 is left in the opened position, the effective volume of the positive air spring chamber 160 will increase and thus, an effective spring rate of the positive air spring chamber 160 will decrease with respect to the closed position of the switching valve 152.

The valve member 194 is basically a tubular member with a center bore 194a that constitutes a gas supply port in fluid communication with the positive air spring chamber 60. In other words, the center bore 194a (e.g., the gas supply port) is provided with the air filling valve 66 for supplying a pressurized fluid (e.g., air) into the positive air spring chamber 60. The outer surface of the valve member 194 has a first externally threaded portion 194b at its upper end, a non-circular shaft portion 194c, an annular flange 194d, an annular recess 194e and a second externally threaded portion 194f at its lower end. The externally threaded portion 194b is provided at the upper end of the valve member 194 to removably secure the air filling valve 66 to the valve member 194. The externally threaded portion 194b is dimensioned for receiving the nut 198. When the valve member 194 is disposed in the non-circular center hole 192b of the hand operated actuator 192, the non-circular shaft portion 194c is engaged with the non-circular shaft portion 194c of the valve member 194 with the nut 198 contacting an upper side of the hand operated actuator 192 and the annular flange 194d contacting a lower side of the hand operated actuator 192. In this way, the hand operated actuator 192 and the valve member 194 are non-movably secured together.

In this illustrated embodiment, the stopper 196 is threaded onto the externally threaded portion 194f at the lower end of the valve member 194 to prevent the switching valve 152 from being disconnected from the upper sealing member 150 when the hand operated actuator 192 is rotated from the closed position to the opened position. In other words, when the hand operated actuator 192 is rotated, the external thread 192a will engage the internal thread 190 of the upper sealing member 150 so that the switching valve 152 will move axially relative to the upper sealing member 150. The annular recess 194e of the valve member 194 is disposed such that when the hand operated actuator 192 is rotated to the point in which that the stopper 196 contacts a lower surface of the upper sealing member 150 (i.e., the opened position), the recess 194e of the valve member 194 aligns with the seal 178 and to unseal the interface between the outer surface of the valve member 194 and the inner surface of the channel 174 of the upper sealing member 150 below the seal 176. In other words, when the switching valve 152 is in the opened position, the seal 178 does not contact the outer surface of the valve member 194. Thus, in this opened position of the switching valve 152, the pressurized fluid (e.g., air) can flow from the positive air spring chamber 60 to the additional positive air-spring chamber 163 via the communication passageway 164. However, the seal 176 prevents the pressurized fluid (e.g., air) from leaking out of the upper end of the tube 70.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle suspension system. Accordingly, these terms, as utilized to describe the present invention should be interpreted relative to a bicycle equipped with the bicycle suspension system as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle suspension system comprising:
    a first tubular element including a first end and a second end;
    a piston slidably disposed in the first tubular element;
    a piston rod having a first end coupled to the piston and a second end extending outwardly of the second end of the first tubular element;
    a first sealing member disposed in the first tubular element adjacent the first end of the first tubular element such that a first air chamber is formed between the piston and the first sealing member; and
    a switching valve coupled to the first sealing member, with the switching valve being movable between a closed position and an opened position, with the switching valve opening a communication passageway between the first air chamber and a second air chamber to connect the first and second air chambers when in the opened position, and closing the communication passageway between the first air chamber and the second air chamber to separate the first and second air chambers when in the closed position,
    the first sealing member including a portion of the communication passageway and a pair of seals with the seals being disposed on axially opposite sides of the portion of the communication passageway, one of the seals separating the first air chamber and the portion of the communication passageway when the switching valve is in the closed position and connecting the first air chamber and the portion of the communication passageway when the switching valve is in the opened position.

2. The bicycle suspension system according to claim 1, wherein
    the second air chamber is located between the piston and a second sealing member disposed in the first tubular element between the piston and the second end of the first tubular element with the piston rod extending through the second sealing member.

3. The bicycle suspension system according to claim 2, wherein
    the second air chamber is primarily formed between the piston and the second sealing member and partly extends up to the vicinity of the first sealing member.

4. The bicycle suspension system according to claim 2, wherein
    the first tubular element includes an outer tube and an inner tube with part of the second air chamber formed between the outer and inner tubes.

5. The bicycle suspension system according to claim 4, wherein
    the first and second sealing members opposite ends of the inner and outer tubes, and the piston slidably engages the inner tube.

6. The bicycle suspension system according to claim 1, wherein
    the switching valve includes an actuator that is threadedly mounted to the first sealing member to move the switching valve between the closed and opened positions.

7. The bicycle suspension system according to claim 1, further comprising
    a second tubular element including an upper end that telescopically receives the second end of the first tubular element and a lower end that is fixedly coupled to the second end of piston rod.

8. The bicycle suspension system according to claim 1, wherein
    the first sealing member includes a partition part that separates the first and second air chambers such that the second air chamber is disposed between the first air chamber and the first end of the first tubular element.

9. The bicycle suspension system according to claim 8, wherein
the first sealing member further includes an end part and a tubular part receiving the switching valve, with the tubular part connecting the end part and the partition part together, and the tubular part having an opening that forms a part of the communication passageway between the first and second air chambers.

10. The bicycle suspension system according to claim 9, wherein
the switching valve is mounted in the tubular part of the first sealing member for axial movement between the closed and opened positions.

11. The bicycle suspension system according to claim 10, wherein
the first sealing member further includes a seal disposed between an interface of the switching valve and the tubular part of the first sealing member, with the seal being disposed to seal the interface when the switching valve is in the closed position and to unseal the interface when the switching valve is in the opened position.

12. The bicycle suspension system according to claim 11, wherein
the switching valve includes a gas supply port in fluid communication with the first air chamber.

13. The bicycle suspension system according to claim 8, wherein
the switching valve includes a gas supply port in fluid communication with the first air chamber.

14. The bicycle suspension system according to claim 8, wherein
the switching valve includes an actuator that is threadedly mounted to the second sealing member to move the switching valve between the closed and opened positions.

15. The bicycle suspension system according to claim 8, further comprising
a second tubular element including an upper end that telescopically receives the second end of the first tubular element and a lower end that is fixedly coupled to the second end of piston rod.

16. A bicycle suspension system comprising:
a first tubular element including a first end and a second end;
a piston slidably disposed in the first tubular element;
a piston rod having a first end coupled to the piston and a second end extending outwardly of the second end of the first tubular element;
a first sealing member disposed in the first tubular element adjacent the first end of the first tubular element such that a first air chamber is formed between the piston and the first sealing member; and
a switching valve coupled to the first sealing member, with the switching valve being movable between a closed position and an opened position, with the switching valve opening a communication passageway between the first air chamber and a second air chamber to connect the first and second air chambers when in the opened position, and closing the communication passageway between the first air chamber and the second air chamber to separate the first and second air chambers when in the closed position,
the switching valve including a gas supply port in fluid communication with the first air chamber.

17. A bicycle suspension system comprising:
a first tubular element including a first end and a second end;
a piston slidably disposed in the first tubular element;
a piston rod having a first end coupled to the piston and a second end extending outwardly of the second end of the first tubular element;
a first sealing member disposed in the first tubular element adjacent the first end of the first tubular element such that a first air chamber is formed between the piston and the first sealing member; and
a switching valve coupled to the first sealing member, with the switching valve being movable between a closed position and an opened position, with the switching valve opening a communication passageway between the first air chamber and a second air chamber to connect the first and second air chambers when in the opened position, and closing the communication passageway between the first air chamber and the second air chamber to separate the first and second air chambers when in the closed position,
the switching valve being movably mounted in an axially extending channel of the first sealing member so that the switching valve is movable an axial direction of the first tubular element between the closed and opened positions, and
the first sealing member including a portion of the communication passageway, which fluidly communicates with the channel of the first sealing member.

18. The bicycle suspension system according to claim 17, wherein
the first sealing member further includes a pair of seals disposed between an interface of the switching valve and an inner surface of the channel of the first sealing member, with one of the seals being disposed to seal the interface when the switching valve is in the closed position and to unseal the interface when the switching valve is in the opened position.

19. The bicycle suspension system according to claim 16, wherein
the second air chamber is located between the piston and a second sealing member disposed in the first tubular element between the piston and the second end of the first tubular element with the piston rod extending through the second sealing member.

* * * * *